(12) United States Patent
Beyda et al.

(10) Patent No.: US 6,505,237 B2
(45) Date of Patent: Jan. 7, 2003

(54) METHOD AND SYSTEM FOR MANAGEMENT OF MESSAGE ATTACHMENTS

(75) Inventors: William J. Beyda, Cupertino, CA (US); Shmuel Shaffer, Palo Alto, CA (US); Paul Bonomo, San Jose, CA (US)

(73) Assignee: Siemens Information & Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/888,999

(22) Filed: Jun. 22, 2001

(65) Prior Publication Data

US 2001/0051991 A1 Dec. 13, 2001

Related U.S. Application Data

(63) Continuation of application No. 09/122,340, filed on Jul. 24, 1998, now Pat. No. 6,275,850.

(51) Int. Cl.[7] .............................................. G06F 15/16
(52) U.S. Cl. .................. 709/206; 709/206; 709/200; 709/217; 709/203; 707/1; 707/10; 370/352; 370/401
(58) Field of Search ................................ 709/206, 207, 709/200, 217, 232, 236; 707/500, 10, 1; 370/352, 401; 395/200.6, 200.36, 200.47, 200.33

(56) References Cited

U.S. PATENT DOCUMENTS

| 5,790,790 A | * | 8/1998 | Smith et al. ............ 395/200.36 |
| 5,809,242 A | * | 9/1998 | Shaw et al. ............. 395/200.47 |
| 5,818,447 A | * | 10/1998 | Wolf et al. .................. 345/335 |
| 5,841,966 A | * | 11/1998 | Irribarren ............... 395/200.36 |
| 5,903,723 A | * | 5/1999 | Beck et al. .................... 707/10 |
| 5,964,833 A | * | 10/1999 | Kikinis ....................... 709/206 |
| 6,035,104 A | * | 3/2000 | Zahariev ................. 395/200.33 |
| 6,052,735 A | * | 4/2000 | Ulrich et al. ................ 709/236 |
| 6,073,142 A | * | 6/2000 | Geiger et al. ............... 707/500 |
| 6,073,165 A | * | 6/2000 | Narasimhan et al. ........ 709/206 |
| 6,092,114 A | * | 7/2000 | Shaffer et al. .................. 707/1 |
| 6,101,320 A | * | 8/2000 | Schuetze et al. ........ 395/200.36 |
| 6,101,526 A | * | 8/2000 | Mochizuki ................... 709/200 |
| 6,101,548 A | * | 8/2000 | Okada ......................... 709/200 |
| 6,115,817 A | * | 9/2000 | Whitmire .................... 713/171 |
| 6,134,582 A | * | 10/2000 | Kennedy ..................... 709/206 |
| 6,138,168 A | * | 10/2000 | Kelly et al. .................. 709/300 |
| 6,185,606 B1 | * | 2/2001 | Bereiter ...................... 709/206 |
| 6,216,165 B1 | * | 4/2001 | Woltz et al. ................. 709/232 |
| 6,240,445 B1 | * | 5/2001 | Kumar et al. ............... 709/206 |
| 6,249,805 B1 | * | 6/2001 | Fleming, III ................ 709/206 |
| 6,256,666 B1 | * | 7/2001 | Singhal ....................... 709/217 |
| 6,273,622 B1 | * | 8/2001 | Ben-David ................ 395/200.6 |
| 6,275,848 B1 | * | 8/2001 | Arnold ........................ 709/206 |
| 6,301,245 B1 | * | 10/2001 | Luzeski et al. .............. 370/352 |
| 6,304,573 B1 | * | 10/2001 | Hicks, III .................... 370/401 |
| 6,356,937 B1 | * | 3/2002 | Montville et al. ........... 709/206 |

* cited by examiner

*Primary Examiner*—Ayaz Sheikh
*Assistant Examiner*—Thu Ha Nguyen

(57) ABSTRACT

A method and system provide user management of electronic message transmissions between servers and client devices, particularly transmissions of files attached to electronic messages. The method and system operate to transfer selected attached files to and from a client device. When accessing electronic messages with attached files stored at a server by a user, the attached files that satisfy a prescribed requirement are automatically downloaded from the server to the client device utilized by the user. The prescribed requirement may include maximum file size and download time, and approved list of file formats and senders. Preferably, the prescribed requirement is entered into the client device by the user. The prescribed requirement can vary depending upon the personal preference of the user. When forwarding received electronic messages with attached files, only the attached files that have been modified are uploaded from the client device to the server.

16 Claims, 4 Drawing Sheets

METHOD AND SYSTEM FOR MANAGEMENT OF MESSAGE ATTACHMENTS

This is a continuation of application Ser. No. 09/122,340 filed Jul. 24, 1998, now U.S. Pat. No. 6,275,850.

TECHNICAL FIELD

The invention relates generally to electronic message delivery systems and more particularly to methods and systems for providing user management of transmissions of electronic messages between servers and client devices.

DESCRIPTION OF THE RELATED ART

Systems that support the exchange of text messages among users often allow files to be attached to messages. As one example, electronic mail (i.e., email) may have an attachment that is a word processing document, or an audio, video or graphics file. As another example, a download of a message from a web site on the World Wide Web may include an attached text file in Hypertext Markup Language (HTML) or an attached audio, video or graphics file.

Messages may be transmitted from a sending client device (such as a computer) or from a remote server (such as a web server) to a message transport server that supports a computer or other client device at which the receiving party attempts to access the message. In an email environment, a sending party may generate an email message at a first computer that transmits the message to a first email server. If the first email server does not support message access for the party to whom the message is directed, the first email server forwards the message to a second email server that supports access by the receiving party. The message is stored at the second server for download by the targeted party.

Depending upon the client device operated by the receiving party and its associated email server, new messages that are stored in the associated email server are selectively downloaded one message at a time, or are downloaded as an aggregate data stream of all new messages. In either case, a compound message having an attached file is typically downloaded as a unit. The download time for messages with attachments including graphics and/or spreadsheets can be considerable. In addition, once commenced, the downloading typically causes the client device to be locked into a wait mode in which other software applications within the client device cannot be accessed.

In a typical message exchange system where all new email messages are downloaded in the aggregate data stream form, accessing email messages may lead to an unproductive waiting period while downloading non-essential email messages with attached files. Even in a message exchange system that allows a user to download one email message at a time, downloading a single email message with a large attached file may take several minutes. Therefore, an inadvertent command by the receiving party to download an email message with a large attachment can also result in an unproductive waiting period. The inadvertent command may be a simple click of a mouse while a screen cursor is on a wrong button or display of a graphical user interface. The waiting period may be increased if the receiving party is remotely accessing the associated server at a slow connection speed. In addition, when forwarding a compound message having an attached file, the attached file is always uploaded from the client device to the server, increasing the overall waiting period when forwarding the received message is warranted.

Recent developments have allowed more flexibility in accessing and downloading electronic messages by the receiving party in order to reduce unnecessary download time. The fourth version of Internet Message Access Protocol (IMAP4) and Multipurpose Internet Mail Extensions (MIME) allow users to download a portion of a message that is stored in the associated server. For example, a user may set his/her computer to download only the headings contained in the text portion of messages when accessing the associated server. The headings are viewed by the user in order to determine whether to download the entire email message along with the attachment. Depending upon the preference of the user, the entire message and any attached message may be downloaded at that time or at a later time.

Although IMAP4 and MIME provide greater user control of accessing and downloading electronic messages from a server than what had been available in the past, employing IMAP4 and MIME in a conventional manner typically requires much supervision. Decisions for downloading a particular attachment of an email are performed manually by the user on an individual basis. Furthermore, IMAP4 and MIME do not alleviate the waiting period during a forwarding process.

What is needed is a messaging method and system that provide extensive user control for downloading attachments of emails, while eliminating the need for individual decisions and input by the user in order to download or upload a desired attachment.

SUMMARY OF THE INVENTION

A method and system provide increased user management of electronic message transmissions between servers and client devices, particularly transmissions of files attached to electronic messages. The method and system operate to selectively transfer attached files to and from a client device. When accessing electronic messages with attached files stored at a server by a user, attached files that satisfy a prescribed requirement are automatically downloaded from the server to the client device utilized by the user. As a second feature, when forwarding received electronic messages with attached files from a client device, only the attached files that have been modified are uploaded from the client device to the server.

The screening of attached files for auto-downloading is controlled primarily by an attachment filter located within the client device. However, the actual execution of the screening process may occur at the server or at the client device. In the preferred embodiment, the attachment filter is a computer program that is configured to recognize the prescribed requirement that triggers the automatic download. The requirement may be selected or modified by the user to customize the screening process.

A criterion that may be utilized as the prescribed requirement for the screening process is the size of the attached file to be auto-downloaded. A maximum size may be input to the client device as a threshold to allow only attached files smaller than the maximum size to be auto-downloaded from the server to the client device. The prescribed requirement may also be characterized by the maximum download time. In this configuration, the attachment filter only allows attached files that may be downloaded faster than a preset threshold download time to be auto-downloaded. The download time can be calculated by factoring in the size of an attached file and the speed of the connection between the server and the client device.

Another criterion that can be utilized by the attachment filter is the identity of the sender. A list of senders may be entered into the client device, such that only attached files that were sent from a person on the list of senders are auto-downloaded. Alternatively, the list of senders may be utilized to auto-download only attached files from senders not on the list of senders.

Similarly, a list of file formats may be utilized to screen attached files. The list of file formats may be entered into the client device by the user such that only attached files that are in a format on the list of file formats are auto-downloaded from the server to the client device. The list of file formats may also be utilized to screen out attached files having a format on the list of. file formats. By carefully selecting the list of file formats, the user can effectively configure the attachment filter to allow or prohibit certain types of attached files to be auto-downloaded.

The screening process may include one or more of the above-mentioned criteria in any combination for selecting which attached files are to be auto-downloaded. Preferably, the user selectively sets the desired criteria in order to auto-download very specific types of attached files. The method and system also allow the user to selectively disengage the screening process, such that all attached files are auto-downloaded from the server to the client device.

During a forwarding operation, attached files are examined to determine whether the attached files need to be uploaded from the client device to the server. Unmodified attached files are not uploaded with the email messages that are being forwarded. Copies of attached files are affixed to appropriate email messages at the server prior to being transferred to target recipients. However, modified attached files are uploaded with the email messages for forwarding.

The screening process of attached files for downloading and the uploading process for forwarding attached files are preferably utilized in combination to efficiently transfer attached files between server and client devices. However, the processes may be separately implemented.

DETAILED DESCRIPTION

Figure 1:
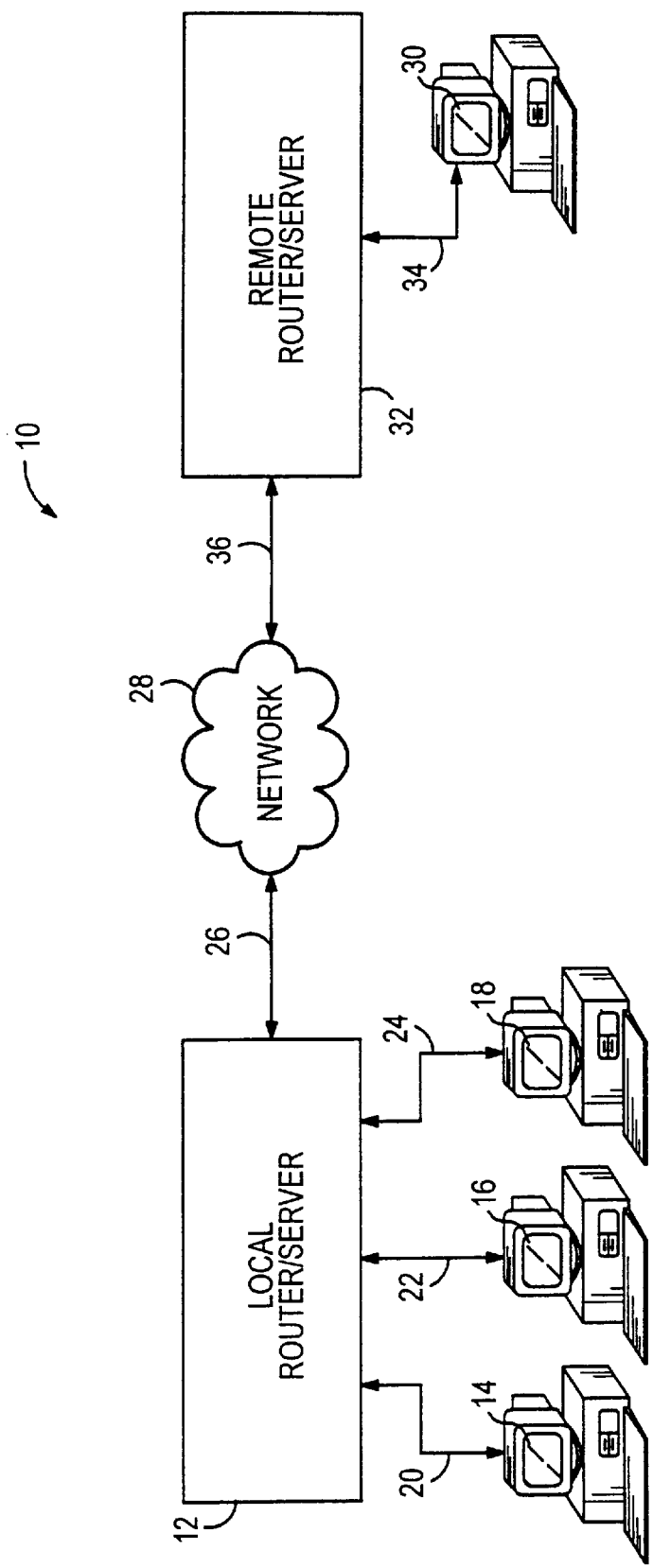
FIG. 1 is a schematic view of one embodiment of a message exchange system that provides user management of transmissions of files attached to email messages in accordance with the invention.

With reference to FIG. 1, a messaging system 10 is shown as including a local router/server 12 for supporting access to stored messages by a number of client devices 14, 16 and 18. The client devices 14, 16 and 18 are communicatively connected to the local router/server 12 by communication links 20, 22 and 24, respectively. The communication links 20, 22 and 24 may be telephony line, cable or wireless connections. The routing operations of the router/server 12 are not the primary focus of the messaging system and method. Furthermore, the structure of the router/server 12 is not critical to the invention. The router/server 12 may be a conventional message server that is able to store received messages and to provide access to the stored messages upon verification of a user identity. Such identification generally requires input of a password that is unique to the user.

The messaging system 10 may be used to exchange messages of any one of a variety of message types. For example, the messages may be downloads from a web site of the World Wide Web, so that a link 26 to a network 28 is a connection to the global communications network referred to as the Internet. However, the method and system will be described primarily with respect to the preferred embodiment of exchanging email messages having file attachments.

As is well known in the art, a person at a remote client device 30 may transmit an email message to a person who accesses email via the local router/server 12. The email message is first transmitted to a remote router/server 32 from the remote client device 30 via a communication link 34. The email message may then be routed from the router/server 32 of the remote client device to the local router/server 12 via two network links 26 and 36 to the network 28. The email message may be accessed by the target user using any of the supported client devices 14, 16 and 18. Although the client devices 14, 16 and 18 are shown as desktop computers, the client devices can be any type of communication device that has the ability to access the local router/server 12 and retrieve email, such as handheld personal computers (HPCs) and personal digital assistants (PDAs).

In an Internet application, the local and remote router/servers 12 and 32 are Internet Service Providers (ISPs). It is not critical that the sending and receiving client devices subscribe to different ISPs. That is, the method to be described below may be utilized to manage messages with attachments sent from one of the local client devices 14, 16 and 18 to another one of the local client devices.

The invention may also be used in a local area network or a wide area network environment. For example, the network 28 may be a corporate network of a single company having one or more sites.

The client devices 14, 16 and 18 are enabled to identify attributes of email messages, including any attached files, that have been received and stored at the local router/server 12. Attributes may include a senders identification, subject matter of the email message, format of the attached file, and size of the attached file. The sender's identification may be an email address that is utilized by the person sending the email message. However, the sender's identification may be a customized user name or user identification number.

In the preferred embodiment, the client devices 14, 16 and 18 are configured to automatically download attached files along with their associated email messages only if the attributes of the email messages and their attachments satisfy a prescribed requirement. The prescribed requirement may include one or more criteria that focus on the attributes of email messages and their attached files. The automatic downloading may occur when the receiving party establishes a communication connection with the local router/server 12 to access stored email messages. Alternatively, the automatic downloading may occur when the receiving party initiates downloading of a particular email message from the local router/server 12. If an email message and its attached file do not satisfy the prescribed requirement, the client devices 14, 16 and 18 may be configured to download only the email message and not the attached file from the local router/server 12.

Figure 2:
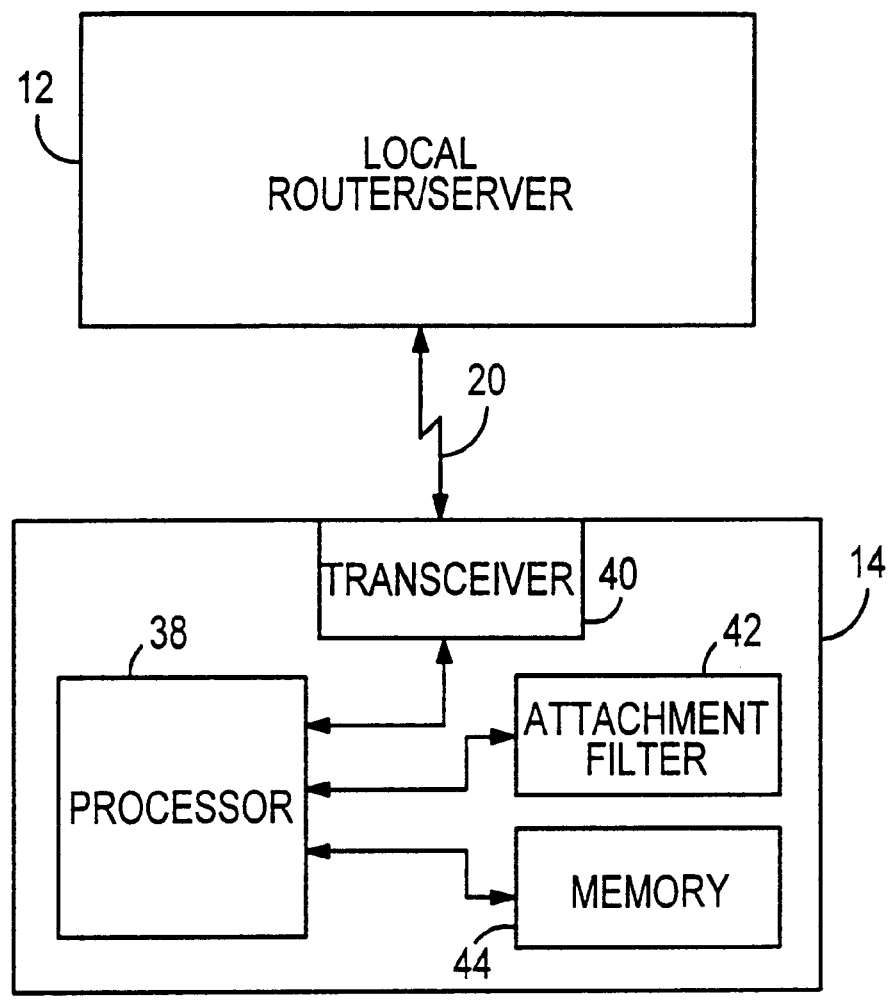
FIG. 2 is a block diagram of the components of a client device in accordance with the invention.

Turning to FIG. 2, a block diagram of components of the client device 14 is shown to illustrate the internal components of the client devices 14, 16, 18 and 30. The client devices 16, 18 and 30 are illustratively represented by the client device 14, since the client devices 14, 16, 18 and 30 may be identically configured with respect to the internal components of each client device. Similar to FIG. 1, the client device 14 is shown connected to the local router/server 12 via the communication link 20. The client device 14 is shown to contain a processor 38 that is coupled to a transceiver 40, an attachment filter 42, and a memory 44. The processor 38 and the memory 44 are functionally equivalent to conventional components that are commonly found in other electronic devices. The attachment filter 42 is a programmable component that can determine which attached files are to be downloaded from the local router/server 12 to the memory 44 of the client device 14. Preferably, the attachment filter 42 allows the receiving party to input the requirement that must be satisfied in order for attached files to be automatically downloaded.

The attachment filter 42 is also configured to determine whether a received attachment has been modified. During a forwarding operation, the attachment filter 42 operates to prevent uploading of attached files that have not been modified. Consequently, only attached files that have not been modified since being downloaded to the client device 14 are transmitted to the local router/server 12, when forwarding electronic messages with attached files.

During a receiving operation, the receiving party initiates the transceiver 40 of the client device 14 to establish communication with the local router/server 12. After communication has been established, the attachment filter 42 and the processor 38 operate to implement a determination that is based upon the prescribed requirement, allowing only attached files that have satisfied the requirement to be automatically transmitted from the local router/server 12 to the client device 14. Other attachments are downloaded only upon command by the receiving party. Prescribed requirements for allowing attached file to be automatically downloaded are described in detail below. Email messages and allowed attached files are downloaded from the local router/server 12 to the memory 44 for viewing by the receiving party.

During a forwarding operation involving a received email message with an attached file, the receiving party again initiates the transceiver 40 to establish communication with the local router/server 12. The receiving party then commands the client device 14 to forward an email message to the sender. In conventional messaging methods, forwarding an email message requires that any file attached to the email message be uploaded to the local server, even if the attached file has not been modified by the receiving party. However, the attachment filter 42 and the processor 38 of the present invention operate to upload only modified attached files. The attachment filter 42 and the processor 38 are able to determine whether an attached file of an email message has been modified since reception of the email message and upload only modified attached files during forwarding operations. If the attached file is determined to be unmodified, the attached file is not uploaded to the local router/server 12. The original email message and any forwarding message (optional) are uploaded without the attached file to the local router/server 12, where a copy of the attached file is affixed to the forwarded email message for routing to a destined party.

Figure 3:
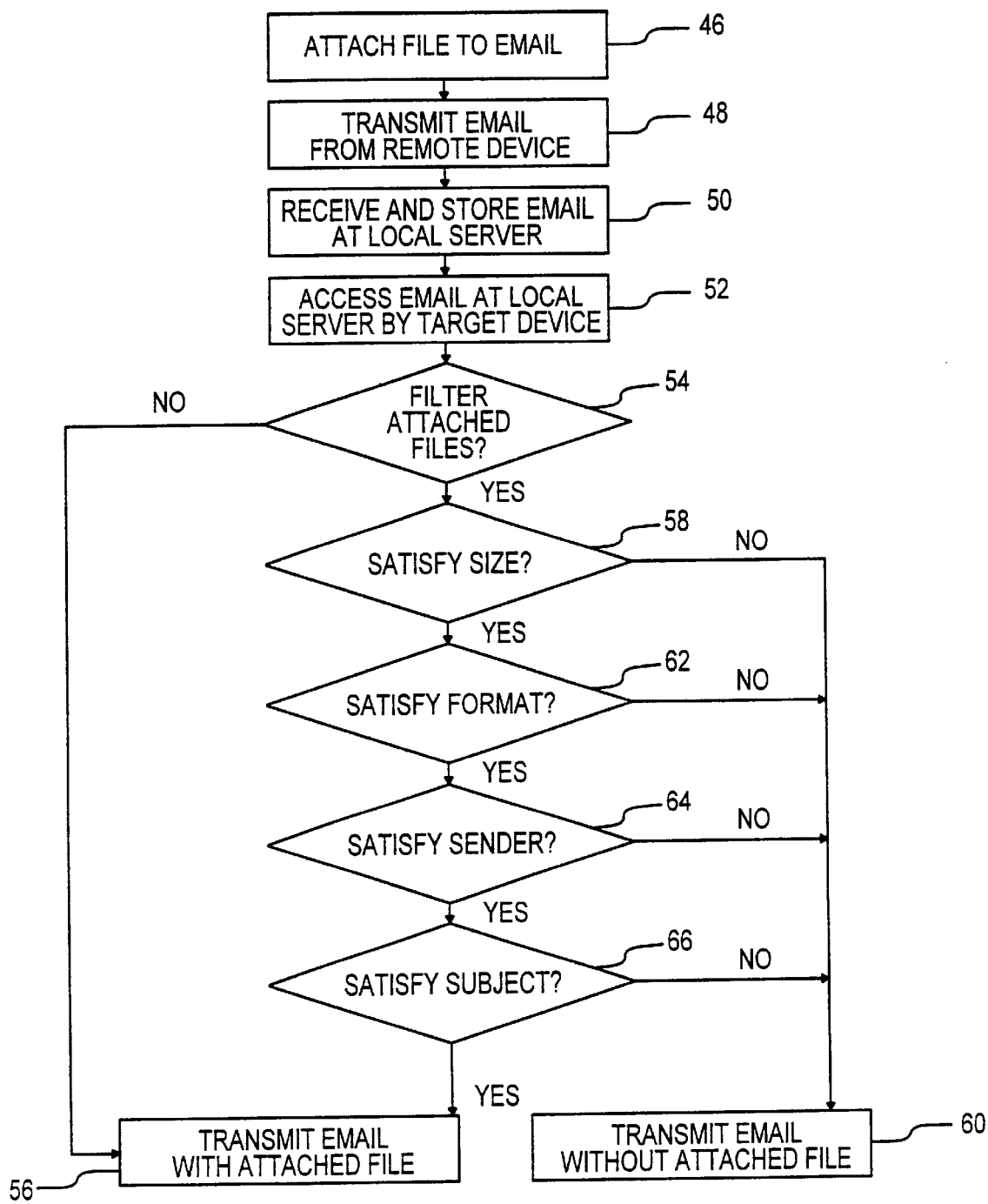
FIG. 3 is a process flow chart for providing user management of transmissions of attached files from a server to a client device in accordance with the invention.

A method of providing user management of transmissions of files attached to electronic messages from a server to a client device in accordance with the invention will be described with reference to FIGS. 1, 2 and 3. In a first step 46, a file is attached to an email message by a sender. Step 46 may be executed at the remote client device 30, shown in FIG. 1. The file may be a word processing document, or an audio, video or graphics file. The file may also be coded in one of many formats that are utilized for a particular type of files. In addition, the size of the file may vary from a few kilobytes to several megabytes. Although step 46 is described as attaching a single file to the email message, multiple files may be attached to the single email message during this step.

At step 48, the email message, including the attached file, is transmitted from the remote client device 30 to the local router/server 12. The email message and the attached file are routed from the remote router/server 32 to the local router/server 12 in situations where the local router/server 12 does not support both the remote and the receiving client devices. Next, at step 50, the email message and the attached file are received and stored at the local router/server 12. The email message and the attached file are stored electronically in a virtual "mailbox" within a memory of the local router/server 12. The virtual mailbox at the local router/server 12 may be accessed using an electronic address that is assigned to the party to whom the email message and the attached file are directed.

In step 52, the receiving party establishes a communication connection with the local router/server 12, employing one of the client devices 14, 16 and 18. Although any one of the client devices 14, 16 and 18 may be utilized by the receiving party, further description of the method will be described with respect to the client device 14. Also in step 52, the receiving party accesses the virtual mailbox at the local router/server 12 that has been assigned to that receiving party in order to view the email message.

Preferably, the attachment filter 42 of the client device 14 has been programmed by the receiving party prior to step 52 with a prescribed requirement for auto-downloading attached files. The prescribed requirement may include the origin of the email message, i.e., the sender of the email message. For example, if the receiving party desires to automatically download only attached files from his/her boss, the receiving party can configure the attachment filter 42 accordingly. Downloading based upon the origin may also involve a list of approved senders for auto-download. Another criterion for the prescribed requirement may be the maximum size of the attached file to be auto-downloaded. The attachment filter 42 may be configured to only allow attached files smaller than a preselected threshold size to be auto-downloaded. For example, if the receiving party has configured the attachment filter 42 for a maximum of 100 kilobytes, any attached files equal to or larger than 100 kilobytes will not be autodownloaded when the accompanying email message is accessed. Such files are accessible only upon request.

In addition, the attachment filter 42 can be configured to only allow files in certain formats to be auto-downloaded. For example, the attachment filter 42 may be configured to auto-download only JPEG or TIF format files. In this manner, the receiving party may control not only the files in certain formats, but also the types of files. That is, by allowing only files in graphics formats to be downloaded, the receiving party can effectively limit the auto-download feature to downloading graphics files. The receiving party may utilize any one of the above-described criteria alone or in combination to tailor the requirement to his/her desire. The attachment filter 42 may also have a default setting that may include one or more criteria.

When the receiving party has accessed the local router/server 12, the processor 38 and the attachment filter 42 operate to determine whether to automatically download the attached file to the memory 44 from the local router/server 12. At step 54, it is determined whether the attachment filter 42 has been configured to filter attached files or not. If the filtering mode has not been activated, the next step in the process is step 56, where the attached file is automatically transmitted from the local router/server 12 to the client device 14. However, if the filtering mode has been selected, the process proceeds to step 58. In step 58, the size of the attached file is compared with a preselected threshold size. If the size of the attached file is equal to or greater than the preselected threshold size, the process proceeds to step 60. At step 60, the email message is transmitted from the local router/server 12 to the client device 14 without the attached file. However, if the attached file is smaller than the preselected threshold size, the next step in the process is step 62. The maximum size can also be characterized by download time, which factors in the size of the attached file and the connection speed between the client device 14 and the local router/server 12. In this configuration, the threshold value may be, for example, thirty seconds of download time. This threshold value of download time can be utilized in a similar manner as the threshold value of size, such that only attached files that can be downloaded faster than the threshold download time are autodownloaded.

At step 62, the file format of the attached file is examined for further screening. In the simplest version of this criterion, a particular file format is selected by the receiving party. With such setting, only attached files having that particular file format would be allowed to proceed. Otherwise, the attached file will not be automatically transmitted to the client device 14. In a more complex version, a list of file formats is utilized to determine whether the attached file falls within the list of file formats. A negative conclusion will initiate step 60, i.e., the attached file will not be transmitted to the client device without a user request. If the format of the attached file is included in the list, then the process proceeds to step 64. The selection process at step 62 may be reversely utilized, such that a positive conclusion will initiate step 60. That is, if the attached file is in a format included in the list of file formats, the email message is transmitted from the server without the attached file.

In step 64, a list of senders is the criterion used to determine whether the attached file should or should not be transmitted. Similar to step 62, the list of senders can have one or more names. Furthermore, the list of senders can be utilized such that either an inclusion or exclusion on the list will lead directly to step 60.

If step 64 is satisfied, the next step in the process is step 66, which utilizes a list of subject matter instead of file formats or senders. At step 66, the criterion is based on the subject matter of the email message. For example, if "X project" is selected by the receiving party, the attachment filter 42 may be configured to prevent auto-downloading of attached files of email messages that are not marked as "X project" subject matter. In this configuration, if the email message is not "X project" subject matter, the process proceeds to step 60. However, if the subject matter is "X project," the email message is transmitted to the client device from the local router/server 12 with the attached file. Identical to steps 62 and 64, the list of subject matter may be reversely implemented, such that only attached files of email messages having a subject matter not contained on the list are auto-download to the client device.

The above method may be modified such that the steps 58, 62, 64 and 66 are arranged in different orders. The order of the steps 58, 62, 64 and 66 is not critical to the invention. In addition, one or more of the steps 58, 62, 64 and 66 may be deleted or deactivated from the selection process. That is, the invention can be properly implemented with only one of steps 58, 62, 64 and 66. Furthermore, the above method may include additional criteria in determining whether to download the attached file along with the associated email message.

After the email message has been transmitted to the client device 14 without the attached file, the receiving party may manually request downloading of the attached file, if so desired. The invention does not preclude manual manipulation to download attached files from the local router/server 12 to the client device 14.

Figure 4:
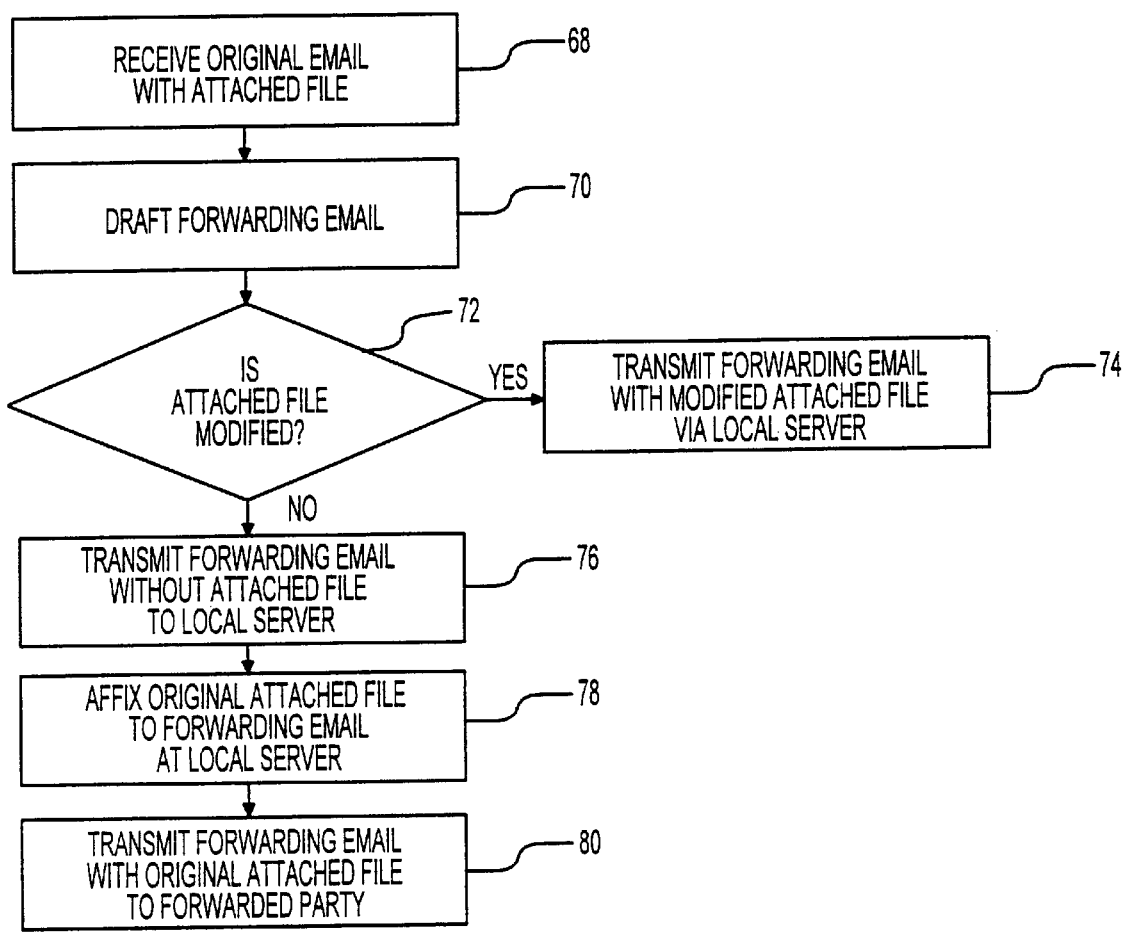
FIG. 4 is a process flow chart for providing user management of transmissions of attached files that were download to a client device, during a forwarding operation, in accordance with the invention.

A method of providing user management of electronic message transmissions during a forwarding operation will be described with reference to FIGS. 1, 2 and 4. The method to be described may be implemented in addition to the above-described method of FIG. 3. However, the method of FIG. 4 may be independently utilized. In a first step 68, an original email message, along with attached file, is received by a client device 14, 16 and 18 from a sender. For example, a receiving party may utilize the client device 14 in order to retrieve and download the original email message and its attached file from the local router/server 12. At step 70, a forwarding email message is drafted by the receiving party in response to the original email message. The attached file that was received along with the original email message may or may not be modified by the receiving party. The step 70 is an optional step. Next, the receiving party commands the client device 14, 16 and 18 to initiate the forwarding process.

Whereas conventional methods transmit all attached files from the client device to its supporting server when forwarding email messages with attached files, the present invention transmits the attached file only if the attached file has been modified since reception by the client device. In step 72, a determination of whether the attached file has been modified is made by the processor 38 and the attachment filter 42 of the client device 14. If the attached file has been modified, step 74 is executed. In step 74, the forwarding message and the original message with the modified attached file are transmitted from the client device 14 to the sender via the local router/server 12. However, if the attached file has not been modified, step 76 is instead executed. In step 76, the forwarding email is transmitted from the client device 14 to the local router/server 12 without the attached file. The manner in which the original email message is transmitted is not critical to the invention. The original email message can follow the same process as the attached file. Alternatively, the original email message may be uploaded to the local router/server 12 from the client device 14 during the forwarding process.

Following step 76, a copy of the attached file is affixed to the forwarding email message at the local router/server 12 in step 78. The local router/server 12 stores, for a limited period, copies of all email messages and any attached files that are relayed through the local router/server 12. The stored copy of the attached file is utilized to affix the copy of the attached file to the forwarding email message at step 78. Next, the forwarding email message, along with the original email message and the attached file, is transmitted from the local router/server 12 to the server that supports the forwarded party in step 80. If the local router/server 12 supports the forwarded party, the email messages and the attached file are transferred to the virtual mailbox of the forwarded party within the local router/server 12.

What is claimed is:

1. A method of managing electronic message transmissions, the method comprising:

transmitting an electronic message and an associated attachment to a target device operated by a user;

storing said associated attachment;

receiving a command from said target device to forward said electronic message and said associated attachment to a selected party;

determining whether said associated attachment has been modified after the transmitting step;

receiving said attachment from said target device if it is determined that said associated attachment has been modified after the transmitting step;

forwarding said electronic message to said selected party;

forwarding said associated attachment received from said target device to said selected party if it is determined that said associated attachment has been modified; and forwarding said stored associated attachment if it is not determined that said associated attachment has been modified.

2. The method of claim 1, said transmitting further comprising:

determining whether said associated attachment satisfies a prescribed requirement established by the user, and automatically transmitting said associated attachment only if said prescribed requirement is satisfied.

3. The method of claim 2, wherein said prescribed requirement includes a requirement that a file size of said associated attachment is less than a preselected threshold size.

4. The method of claim 2, wherein said prescribed requirement includes a requirement that an estimated download time for said associated attachment is less than a threshold download time.

5. The method of claim 2, wherein said prescribed requirement includes a requirement that a file format of said associated attachment corresponds to at least one format from a list of formats established by the user.

6. The method of claim 2, wherein said prescribed requirement includes a requirement that a sender of said associated attachment corresponds to at least one sender from a list of senders established by the user.

7. An email delivery system comprising:

an email server for transmitting an email message and an associated attachment to a client device, the email server including a server memory for storing the associated attachment; and a client device in communication with the email server for receiving the email message and the associated attachment, and for transmitting a command to the email server to forward the email message and the associated attachment to a selected party, wherein the email server determines if the associated attachment has been modified after the associated attachment was transmitted to the client device, and, if the associated attachment has been modified, receives the modified attachment from the client device and forwards the email message and the modified attachment to the selected party, and, if the associated attachment has not been modified, forwards the email message and the attachment stored in the server memory to the selected party.

8. The system of claim 7, further comprising a filter operatively associated with said client device for distinguishing said associated attachment based upon a user-selected criterion such that said attachment is transmitted to said client device by said server only if said user-selected criterion is satisfied.

9. The system of claim 8, wherein said filter is located at said client device.

10. The system of claim 9, wherein said filter comprises a computer program stored in said memory of said client device.

11. The system of claim 8, wherein said user-selected criterion may be modified by a user.

12. The system of claim 8, wherein the filter is located at the email server.

13. The system of claim 8, wherein said user-selected criterion comprises at least one of:

a threshold file size of the associated attachment, an identified sender of the email message, and a threshold estimated download time for the associated attachment.

14. The system of claim 8, wherein a user of the client device may override the user-selected criterion and receive the attachment from the email server.

15. A method for selectively uploading an attachment associated with an email message, the method comprising:

receiving an email message having an associated attachment from an email server, receiving a command from a user to forward the email message and the associated attachment to a selected party;

determining whether the associated attachment has been modified after the associated attachment was received from the email server, and forwarding the associated attachment to the email server for transmission to the selected party only if the associated attachment has been modified.

16. The method of claim 15, wherein a copy of said associated attachment stored in a memory of the email server is affixed to the forwarded message by the email server if the associated attachment has not been modified.

* * * * *